United States Patent
Effing

(10) Patent No.: US 7,570,030 B2
(45) Date of Patent: Aug. 4, 2009

(54) BOOST CONVERTER CIRCUIT HAVING SELECTABLE MODES

(75) Inventor: Hermanus Johannes Effing, Nijmegen (NL)

(73) Assignee: ST-Ericsson SA, Geneva (CH)

( * ) Notice: Subject to any disclaimer, the term of this patent is extended or adjusted under 35 U.S.C. 154(b) by 405 days.

(21) Appl. No.: 10/575,642

(22) PCT Filed: Oct. 6, 2004

(86) PCT No.: PCT/IB2004/051984

§ 371 (c)(1),
(2), (4) Date: Apr. 12, 2006

(87) PCT Pub. No.: WO2005/036723

PCT Pub. Date: Apr. 21, 2005

(65) Prior Publication Data

US 2007/0018614 A1    Jan. 25, 2007

(30) Foreign Application Priority Data

Oct. 13, 2003   (EP)   ................................. 03103768

(51) Int. Cl.
*G05F 1/652* (2006.01)
*G05F 1/656* (2006.01)
*G05F 1/44* (2006.01)

(52) U.S. Cl. ........................ 323/222; 323/284; 323/285; 323/286

(58) Field of Classification Search ................. 323/222, 323/282, 284, 285, 286
See application file for complete search history.

(56) References Cited

U.S. PATENT DOCUMENTS

| | | | |
|---|---|---|---|
| 5,350,997 A * | 9/1994 | Ghotbi et al. | 323/268 |
| 5,565,761 A * | 10/1996 | Hwang | 323/222 |
| 5,831,846 A | 11/1998 | Jiang | |
| 5,847,949 A | 12/1998 | Jiang | |
| 6,028,418 A * | 2/2000 | Jovanovic et al. | 323/222 |
| 6,434,028 B1 * | 8/2002 | Takeuchi et al. | 363/59 |
| 6,469,476 B1 | 10/2002 | Barrett et al. | |
| 6,522,192 B1 * | 2/2003 | Sander | 327/536 |

FOREIGN PATENT DOCUMENTS

| | | |
|---|---|---|
| EP | 1 049 240 | 11/2000 |
| GB | 2 302 619 | 1/1997 |

* cited by examiner

Primary Examiner—Bao Q Vu

(57) ABSTRACT

The present invention relates to a boost converter which can operate both in a capacitive and in an inductive mode. In the capacitive mode the converter operates as a charge pump circuit by making use of a set of switches and a set of capacitors. In the inductive mode the converter operates as a boost circuit and uses a sub-set of the switches and an inductor. The mode is selected by means of a selection terminal that is also used in the capacitive mode for coupling of a battery to the boost converter.

7 Claims, 5 Drawing Sheets

BOOST CONVERTER CIRCUIT HAVING SELECTABLE MODES

Figure 1:
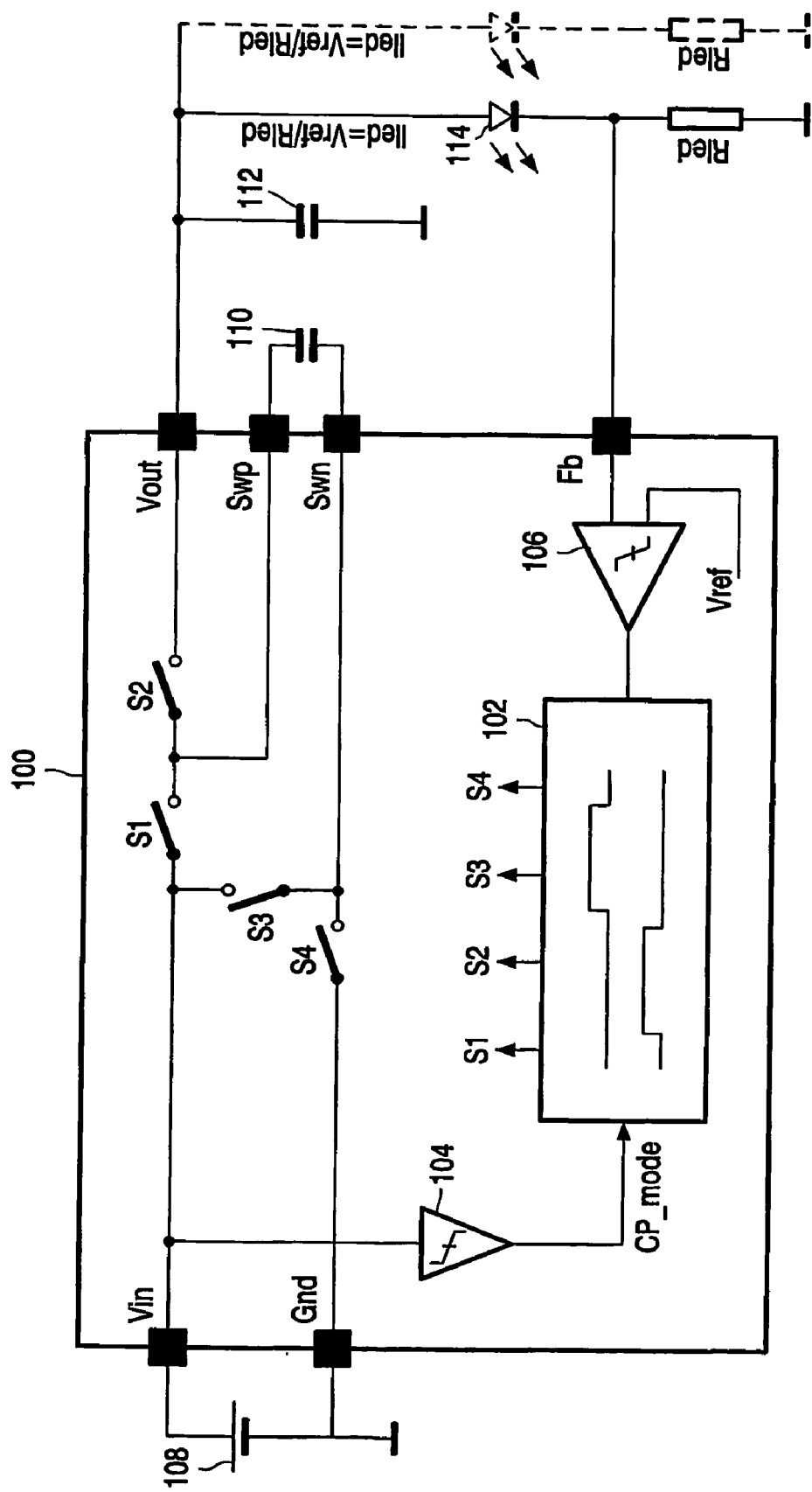

The present invention relates to the field of DC/DC converters, and more particularly without limitation, to boost converters.

In the prior art boost converters are used for providing an output voltage which is greater than the supply voltage. This is especially useful for battery powered devices which require a higher operating voltage than the battery voltage.

Typically boost converters are used as a power supply for white light emitting diodes, such as for illumination of displays or keyboards in portable applications, like mobile phones or personal digital assistants.

A boost converter is essentially a form of switch-mode power supply. Various boost converter designs have been disclosed in the prior art, e.g. in U.S. Pat. No. 6,469,476B1, U.S. Pat. No. 5,847,949, U.S. Pat. No. 5,831,846, UK2302619A, and EP1049240A1.

Two major boost converter implementations are used at present. Capacitive boost converters which are also known as charge pumps, are mainly used in low cost applications and applications where the smallest size of components is important The capacitive converters are generally implemented as controlled voltage doubling circuits, as this leads to the smallest number of external components, i.e. two capacitors. Multiple white light emitting diodes (LEDs) have to be connected in parallel to the output of the capacitive boost converter. Individual current balancing resistors are needed to balance the currents through each white LED which is essential to obtain uniform brightness from the LEDs.

Inductive converters are used in applications where high power efficiency is more important than cost and/or size of the components. Inductive converters are more flexible with respect to the input/output voltage relation than capacitive converters. Multiple white LEDs can be connected in series, ensuring identical forward current and thus uniform brightness of all LEDs.

The present invention provides for a boost converter which can be operated both in a capacitive mode and in an inductive mode. This enables a user to optimize a given application either for low cost in the capacitive mode or best performance in the inductive mode without changing the converter itself. The mode selection is performed by means of a selection terminal.

In accordance with a preferred embodiment of the invention the selection terminal is not an extra selection pin but one of the terminals of the boost converter for coupling of external components. This is particularly advantageous as it limits the number of external pins of the boost converter.

In accordance with a further preferred embodiment of the invention the capacitive mode of operation is selected by coupling of an input voltage source to the selection terminal. To select the inductive mode the selection terminal is coupled to ground. This has the advantage that no extra pin is needed on the converter to set the capacitive or inductive mode.

In accordance with a further preferred embodiment of the invention the boost converter has a switch controller which provides switching sequences for the capacitive and inductive modes. In both the capacitive and inductive modes the switching sequences have an idle phase, energy storage phase and energy transfer phase.

In accordance with a further preferred embodiment of the invention the boost converter has a set of switches which are operated in the capacitive mode. A sub-set of the set of switches which are used in the capacitive mode are operated in the inductive mode.

In accordance with a further preferred embodiment of the invention, the switch controller is implemented by means of a counter which is coupled to a clock signal.

In accordance with a further preferred embodiment of the invention the boost converter has a comparator which is coupled to the selection terminal in order to determine the selection of the capacitive or inductive mode. By means of the comparator the voltage applied to the selection terminal is compared with a reference. If the voltage at the selection terminal surpasses the threshold this indicates that the capacitive mode has been selected; likewise, if the voltage at the selection terminal is below the threshold, this indicates that the inductive mode has been selected.

In accordance with a further preferred embodiment of the invention the boost converter has a comparator which has one input coupled to an external resistive element. The comparator compares the voltage drop over the external resistive element with a voltage reference. When the voltage drop over the external resistive element indicates that more energy is needed, i.e. when the voltage drop is below the voltage reference, a transition from the idle phase or energy storage phase to the energy transfer phase is triggered.

The present invention is particularly useful for battery powered applications, such as LED supply circuits and boost converters for subscriber identity modules (SIMs) of mobile phones, USB interfaces or other 5 V based interfaces in battery powered applications.

Figure 2:
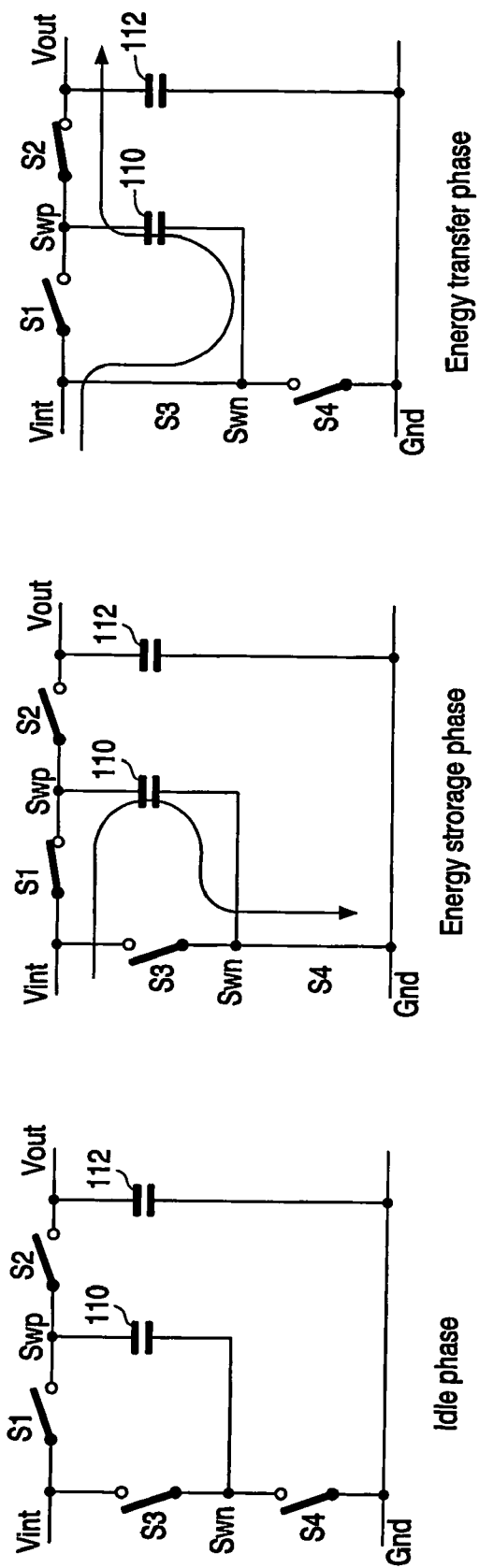
Figure 3:
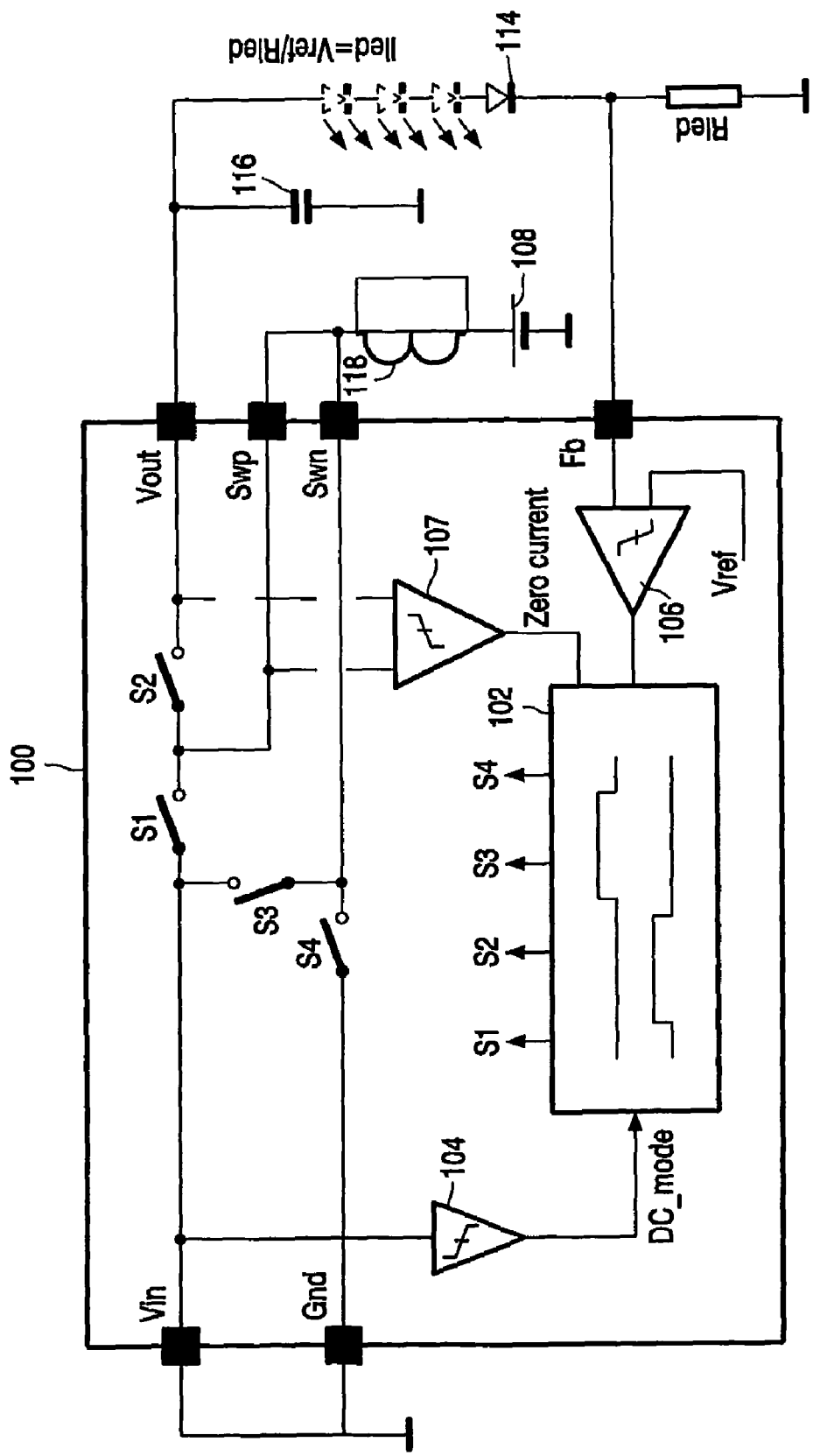
Figure 4:
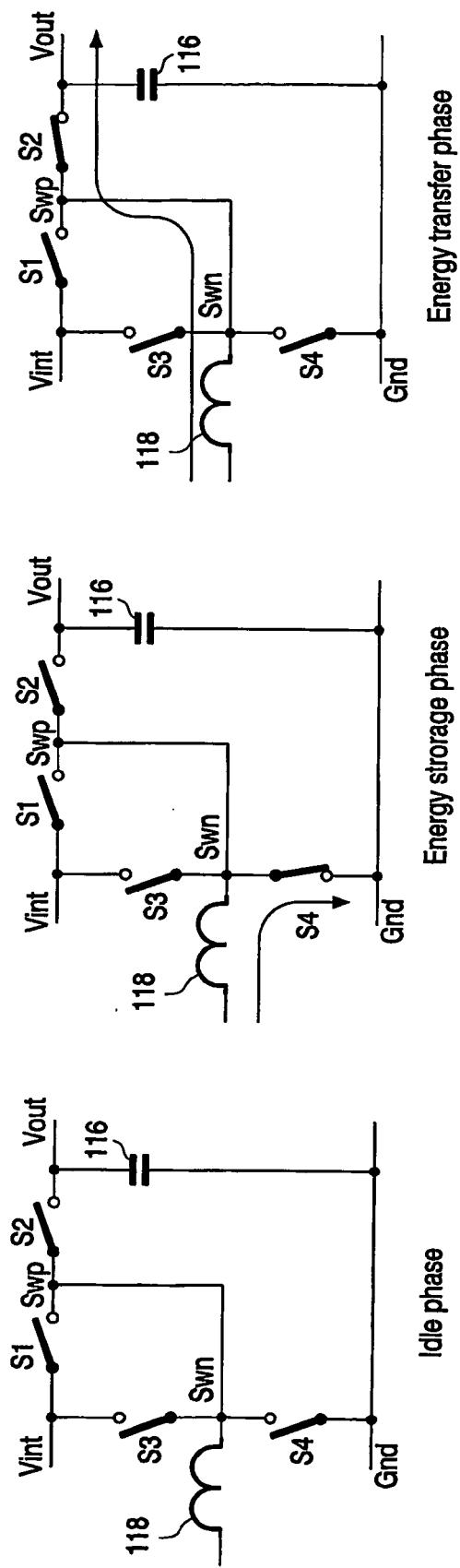
Figure 5:
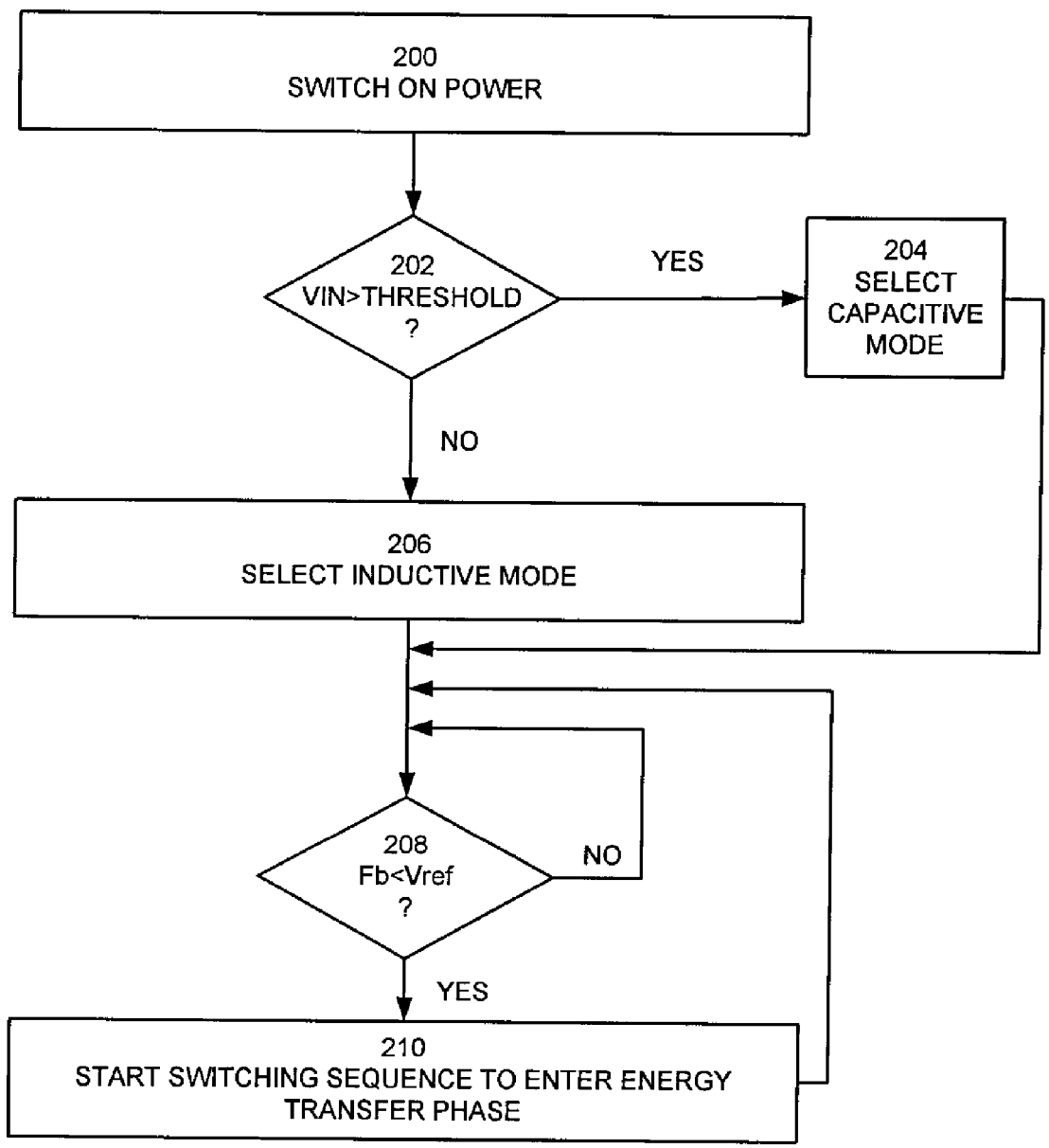

In the following preferred embodiments of the invention will be described in greater detail by making reference to the drawings in which:

FIG. 1 is a schematic circuit diagram of a preferred embodiment of a boost converter in capacitive mode, FIG. 2 is illustrative of a switching sequence of the switches of the boost converter in the capacitive mode, FIG. 3 is a schematic circuit diagram of the boost converter of FIG. 1 in inductive mode, FIG. 4 is illustrative of a switching sequence of the switches of the boost converter in the inductive mode, FIG. 5 is a flow chart of a preferred embodiment of a method of the invention.

FIG. 1 shows boost converter 100. Boost converter 100 has external terminals Vin, Gnd, Vout, Swp, Swn and M.

Switches S1 and S2 are connected in series between terminal Vin and Vout. Terminal Swp is coupled to the common terminal of switches S1 and S2. Switch S3 is coupled between terminals Vin and Swn. Switch S4 is coupled between Gnd and Swn.

Further boost converter 100 has switch controller 102. Switch controller 102 provides output signals S1, S2, S3 and S4 in order to control the respective switches S1, S2, S3 and S4. Switch controller 102 implements two alternative switching sequences for the switches S1 to S4 corresponding to the capacitive and the inductive modes.

Switch controller 102 is coupled to the output of Smith trigger 104 which determines the mode selection. Smith trigger 104 has its input coupled to the mode selection terminal, i.e. terminal Vin.

Comparator 106 of boost converter 100 compares the voltage applied at feedback terminal Fb with reference voltage Vref. When the voltage at terminal Fb drops below the reference voltage Vref comparator 106 provides a trigger signal to switch controller 102 in order to start the applicable switching sequence.

In the application example considered here battery 108 is coupled between terminals Vin and Gnd of boost converter 100. Battery 108 delivers a DC voltage which is to be up-converted by boost converter 100 to a higher DC voltage.

External capacitor 110 is coupled between terminals Swp and Swn of boost converter 100; external capacitor 112 is coupled between terminal Vout and ground.

At least one external light emitting diode (LED) is coupled between terminals Vout and M of boost converter 100. Further external resistor Rled is coupled between terminal Fb and ground. One or more series connections of further LEDs and resistors Rled can be connected in parallel between terminal Vout and ground.

In operation the battery voltage applied at terminal Vin causes a mode selection signal at the output of Smith trigger 104 which indicates the capacitive mode. In response switch controller 102 selects the switching sequence for the capacitive mode.

By means of the selected switching sequence boost converter 100 transfers a sufficient amount of charge into capacitor 110 to provide an about constant supply voltage for the at least one LED 114. The amount of charge which is provided from boost converter 100 to capacitor 110 is regulated by measuring the voltage drop over resistor Rled and comparing the voltage drop with Vref by comparator 106. The voltage at terminal Fb is thus controlled to be about equal to Vref. Hence the current through LED 114 and resistor Rled is about $$I_{led} = V_{ref}/R_{led}.$$

FIG. 2 shows the switching sequence for the capacitive mode in more detail. The switching sequence has an idle phase, an energy storage phase, and an energy transfer phase.

In the idle phase all switches S1 to S4 are open. In the energy storage phase switches S1 and S4 are controlled by switch controller 102 (cf. FIG. 1) to be closed whereas switches S2 and S3 remain open. This way capacitor 110 is coupled in parallel to the supply voltage provided by the external battery which is coupled to the boost converter. Thus charge is "pumped" into capacitor 110.

After a predetermined amount of time the switching sequence goes over to the energy transfer phase in which the switches S1 and S4 are controlled by the switch controller to be open and switches S2 and S3 are closed. This way charge is provided from capacitor 110 to the external load, i.e. the at least one LED 114 in the example considered here.

In other words capacitor 110 is charged with the Vin voltage in the energy storage phase; thus the charge Q on capacitor 110 equals $Q = V_{in} \cdot C110$, where C110 is the capacitance of capacitor 110. During the energy transfer phase the charge on capacitor 110 is transferred to the output, thus to capacitor 112, such that the output voltage is increased by $V_{in} \cdot C100/C112$, where C112 is the capacitance of capacitor 112.

The output load, which are LEDs in this case, is supplied from capacitor 112 so the charge on capacitor 112 is decreased by the load $\Delta Q = I_{load} \cdot time$, where Iload is the total of the currents Iled.

A lower voltage on capacitor 112 leads to a lower load current, thus a lower voltage on the terminal Fb. So after some time the voltage on the feedback terminal Fb decreases below the switching level of comparator 106. When this occurs a new sequence is initiated. The current feedback thus insures that the repetition frequency of the switching sequences leads to the desired average current level through the load, so $$F_{sw} * V_{in} * C110 = I_{led} * R_{led} => F_{sw} = (I_{led} * R_{led})/(V_{in} * C110)$$

where Fsw is the switching frequency.

Next the switching sequence implemented by switch controller 102 goes back into the idle phase until the next switching sequence is triggered by comparator 106. It is to be noted that the switching sequence can either start in the idle phase or in the energy storage phase depending on the implementation.

FIG. 3 shows boost converter 100 in the inductive mode. In the inductive mode terminals Vin and Gnd are coupled to ground. Terminal Vout is coupled to an external load. In the example considered here this is at least one LED 114 or a series of LEDs 114. Further terminal Vout is coupled to external capacitor 116 which has its other terminal connected to ground.

Terminals Swp and Swn are coupled to one terminal of inductance 118. The other terminal of inductance 118 is connected to battery 108.

The inductive mode is detected by Smith trigger 104 due to the ground potential at mode selection terminal Vin. In response to the corresponding mode selection signal "DC_mode" provided by Smith trigger 104 switch controller 102 selects switching sequence for the inductive mode.

By means of this switching sequence energy is provided from boost converter 100 to inductance 118 which supplies the at least one LED 114. The energy transfer from boost converter 100 to inductance 118 is controlled on the basis of the voltage drop over resistor Rled that is sensed at terminal Fb. This results in an about constant current Iled through the at least one LED 114, i.e.

$$I_{led} = V_{ref}/R_{led}.$$

The switching sequence for the inductive mode is explained in more detail in FIG. 4. The switching sequence in the inductive mode has an idle phase, energy storage phase and energy transfer phase as it is the case in the capacitive mode. In the idle phase all switches are open. In the energy storage phase switch S4 is closed while all other switches remain open. This way a current flows through inductance 118 such that energy is stored in the resulting electromagnetic field.

In the subsequent energy transfer phase this energy is transferred from inductance 118 to the load. In the energy transfer phase switch S2 is closed and switch S4 is opened while switches S1 and S3 remain open. The comparator 106 triggers a new sequence starting with the energy storage phase. In the preferred embodiment considered here comparator 106 does not initiate the energy transfer phase. The energy storage phase has a fixed duration set by the controller 102. The energy transfer phase follows automatically after the energy storage phase.

The energy transfer phase is ended when all of the energy in the inductor is transferred to the output, so when the currents in the inductance is reduced to zero. This moment is typically detected by comparator 107 which monitors the current through switch S2. The idle phase is entered when comparator 107 detects a zero current level in switch S2. The feedback comparator initiates a new sequence when the output current dropped below the threshold level of the feedback comparator 106. It is to be noted that the zero current detection comparator 107 is not used, i.e. not activated, in the capacitive mode.

It is to be noted that in the preferred embodiment considered here the switching sequences for the capacitive mode and inductive mode are identical, except that switches S1 and S3 are not operated in the inductive mode, i.e. switches S1 and S3 remain open at all times in the inductive mode.

FIG. 5 shows a corresponding flow chart. In step 200 power is switched on. In step 202 the selected mode is determined. This is done by comparing the voltage potential at selection terminal Vin with a threshold level. If the potential at Vin is above the threshold this indicates that the capacitive mode has been selected. As a consequence the capacitive switching sequence is selected in step 204. If the contrary is the case the inductive switching sequence is selected in step 206.

In either case it is determined in step 208 whether the voltage at terminal Fb is below the reference voltage Vref. If this is not the case nothing happens until the voltage potential at terminal Fb has dropped below the reference voltage Vref. When voltage potential at terminal Fb has dropped below the reference voltage Vref the switching sequence is started in step 210 in order to enter the energy transfer phase such that the voltage potential at terminal Fb is increased above the reference voltage V ref. After a predetermined amount of time the energy transfer phase is completed and the control goes back to step 208.

LIST OF REFERENCE NUMERALS

| | |
|---|---|
| 100 | boost converter |
| 102 | switch controller |
| 104 | Smith trigger |
| 106 | comparator |
| 107 | comparator |
| 108 | battery |
| 110 | capacitor |
| 112 | capacitor |
| 114 | LED |
| 116 | capacitor |
| 118 | inductance |

The invention claimed is:

1. A boost converter having voltage selectable modes comprising:
   a selection terminal, wherein the selection terminal is associated with a voltage Vin;
   a capacitive boost circuit, wherein the capacitive boost circuit is utilized in a capacitive mode;
   an inductive boost circuit, wherein the inductive boost circuit is utilized in an inductive mode;
   a first comparator, wherein the first comparator is configured to compare Vin to a reference voltage Vref and to select the capacitive mode if Vin>Vref and to select the inductive mode if Vin>Vref.

2. The boost converter of claim 1, wherein the selection terminal is coupled to a voltage source in the capacitive mode and wherein the selection terminal is coupled to ground in the inductive mode.

3. The boost converter of claim 1, further comprising a switch controller configured for performing a switching sequence, the switching sequence operative to cycle the selected capacitive or inductive mode through an idle phase, an energy storage phase and an energy transfer phase.

4. The boost converter of claim 3, further comprising a set of switches responsive to the switch controller to execute the switching sequence for the capacitive mode and a sub-set of the set of switches to execute the switching sequence for the inductive mode.

5. The boost converter of claim 3, wherein the switch controller further comprises a counter for receiving a clock signal and wherein the clock signal controls a transition from the energy storage phase to the energy transfer phase.

6. The boost converter of claim 3 further comprising a second comparator for comparing a voltage drop over an external resistive element to a voltage reference in order to trigger a transition from the idle phase to the energy storage phase.

7. A method of DC/DC conversion using a boost converter having voltage selectable modes and comprising a selection terminal, wherein the selection terminal is associated with a voltage Vin, a capacitive boost circuit, wherein the capacitive boost circuit is utilized in a capacitive mode and an induction boost circuit, wherein the inductive boost circuit is utilized in an inductive mode, the method comprising:
   comparing Vin to a reference voltage Vref;
   selecting the capacitive mode if Vin>Vref; and
   selecting the inductive mode if Vin>Vref.

* * * * *

UNITED STATES PATENT AND TRADEMARK OFFICE
CERTIFICATE OF CORRECTION

| | | |
|---|---|---|
| PATENT NO. | : 7,570,030 B2 | Page 1 of 1 |
| APPLICATION NO. | : 10/575642 | |
| DATED | : August 4, 2009 | |
| INVENTOR(S) | : Hermanus Johannes Effing | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Seventh Day of September, 2010

David J. Kappos
*Director of the United States Patent and Trademark Office*